(12) United States Patent
Ko

(10) Patent No.: US 10,704,780 B1
(45) Date of Patent: Jul. 7, 2020

(54) WATER SOLAR LAMP

(71) Applicant: Joseph Y. Ko, Laguna Niguel, CA (US)

(72) Inventor: Joseph Y. Ko, Laguna Niguel, CA (US)

( * ) Notice: Subject to any disclaimer, the term of this patent is extended or adjusted under 35 U.S.C. 154(b) by 0 days.

(21) Appl. No.: 16/262,149

(22) Filed: Jan. 30, 2019

(51) Int. Cl.
| | |
|---|---|
| *F21V 31/00* | (2006.01) |
| *H02S 30/00* | (2014.01) |
| *F21V 23/04* | (2006.01) |
| *F21S 9/03* | (2006.01) |
| *F21W 131/401* | (2006.01) |
| *H02S 40/38* | (2014.01) |

(52) U.S. Cl.
CPC .............. *F21V 31/00* (2013.01); *F21S 9/037* (2013.01); *F21V 23/04* (2013.01); *H02S 30/00* (2013.01); *F21W 2131/401* (2013.01); *H02S 40/38* (2014.12)

(58) Field of Classification Search
CPC .. F21W 2131/401; F21V 31/00; A01K 85/01; F21L 4/00
USPC ......................................... 362/101
See application file for complete search history.

(56) References Cited

U.S. PATENT DOCUMENTS

| | | | |
|---|---|---|---|
| 8,858,015 B2 * | 10/2014 | Harshaw ................. | F21S 9/037 362/183 |
| 9,347,629 B2 | 5/2016 | Stork et al. | |
| 2007/0230161 A1* | 10/2007 | Longoria ................. | F21S 8/00 362/101 |
| 2014/0162509 A1 | 6/2014 | Harrington | |
| 2019/0154229 A1* | 5/2019 | Jurek ...................... | F21S 45/47 |

* cited by examiner

*Primary Examiner* — Julie A Bannan
(74) *Attorney, Agent, or Firm* — Muncy, Geissler, Olds & Lowe, P.C.

(57) ABSTRACT

A water solar lamp comprises a light transmissive casing, a solar panel, a power processing unit, and a plurality of light emitting components. The light transmissive casing comprises an upper cover, a base assembled with the upper cover, and an installation space defined by the upper cover and the base. The base is set as a water-facing side, the base comprises a ring groove for temporarily storing gas when the light transmissive casing is disposed on water, and the ring groove divides the base into an inner ring region and an outer ring region. The solar panel is disposed on the upper cover, and the power processing unit is disposed in the installation space and connected to the solar panel. The plurality of light emitting components are disposed in the installation space, and the plurality of light emitting components receive power provided by the power processing unit to emit light.

6 Claims, 6 Drawing Sheets

WATER SOLAR LAMP

FIELD OF THE INVENTION

The present invention relates to a solar lamp, and more particularly to a water solar lamp.

BACKGROUND OF THE INVENTION

In order to increase the atmosphere of swimming pool, there are manufacturers who provide lamps that float on the surface of water. However, the lamps are different from the life-saving lamp and sea-floating prompt light disclosed in the U.S. Pat. No. 9,347,629 and U.S. Patent Publication No. 2014/162509. Moreover, most of the lamps used in swimming pools today only focus on the lighting effect, and the design for floating stability is not taken into consideration, resulting in the lamps to be easily overturned by waves caused by swimmers.

SUMMARY OF THE INVENTION

A main object of the present invention is to solve the problem that the conventional lamps are easily overturned by waves caused by swimmers.

In order to achieve the above object, the present invention provides a water solar lamp comprising a light transmissive casing, a solar panel, a power processing unit, and a plurality of light emitting components. The light transmissive casing comprises an upper cover, a base assembled with the upper cover, and an installation space defined by the upper cover and the base. The base is set as a water-facing side, the base comprises a ring groove for temporarily storing air when the light transmissive casing is disposed on water, and the ring groove divides the base into an inner ring region and an outer ring region. The solar panel is disposed on the upper cover, and the power processing unit is connected to the solar panel. The plurality of light emitting components are disposed in the installation space, and connected to the power processing unit for receiving power to emit light.

In one embodiment, the water solar lamp comprises a battery disposed in the installation space and connected to the power processing unit.

In one embodiment, the ring groove is a circle or a polygon.

In one embodiment, the water solar lamp comprises a support frame disposed on a side of the upper cover facing the base and providing installation for the power processing unit and the plurality of light emitting components.

In one embodiment, the plurality of light emitting components are divided into a lateral light projecting group disposed around a periphery of the support frame and a bottom light projecting group disposed facing the base.

In one embodiment, the support frame comprises an outer wall provided for disposing the lateral light projecting group, and at least one central mounting post provided for disposing the bottom light projecting group.

In one embodiment, the base is an arcuate surface in the inner ring region, and the outer ring region includes a plane extending from the ring groove and a bevel connected to the plane, wherein the bevel extends toward the upper cover.

In one embodiment, the water solar lamp includes a switch disposed on the upper cover and connected to the power processing unit.

In one embodiment, the upper cover comprises a first adjoiner disposed at an end edge, and the base comprises a second adjoiner disposed at an end edge and assembled with the first adjoiner. The first adjoiner comprises a plurality of first waterproof walls disposed at intervals, and heights of the plurality of first waterproof walls are gradually increased from the end edge of the upper cover toward the installation space, and the second adjoiner comprises a plurality of second waterproof walls disposed at intervals, and heights of the plurality of second waterproof walls are gradually increased from the end edge of the base toward the installation space.

According to the aforementioned disclosure, the present invention comprises the following features as compared with the conventional techniques: the water solar lamp of the present invention is provided with the ring groove disposed on the base, so as to store air temporarily when the water solar lamp is disposed on water, thereby increasing the floating stability of the water solar lamp.

DETAILED DESCRIPTION OF THE PREFERRED EMBODIMENTS

The detailed description and technical contents of the present invention are described below with reference to the drawings.

Figure 1:
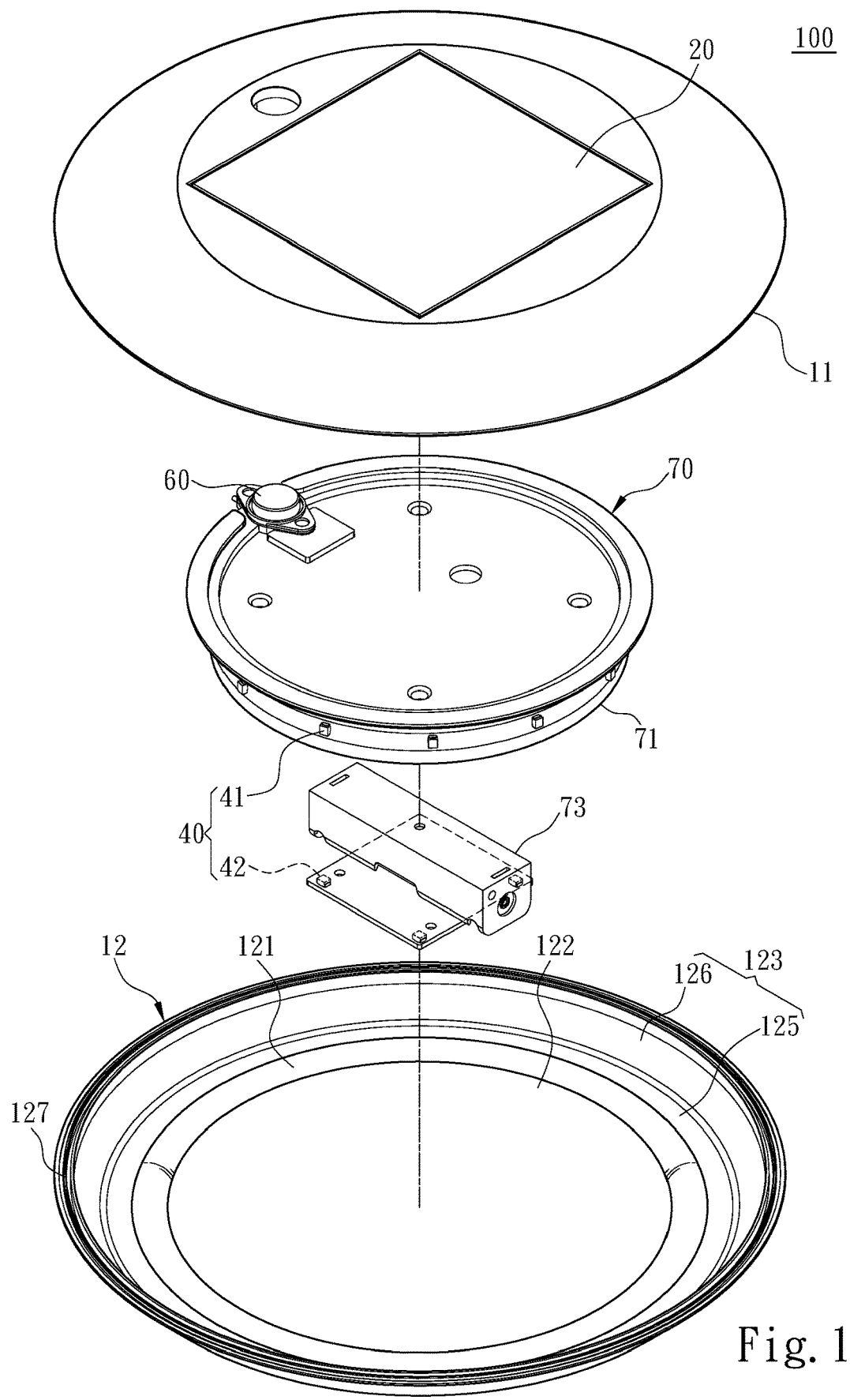
FIG. 1 is a structural exploded view of an embodiment of a water solar lamp of the present invention.
Figure 2:
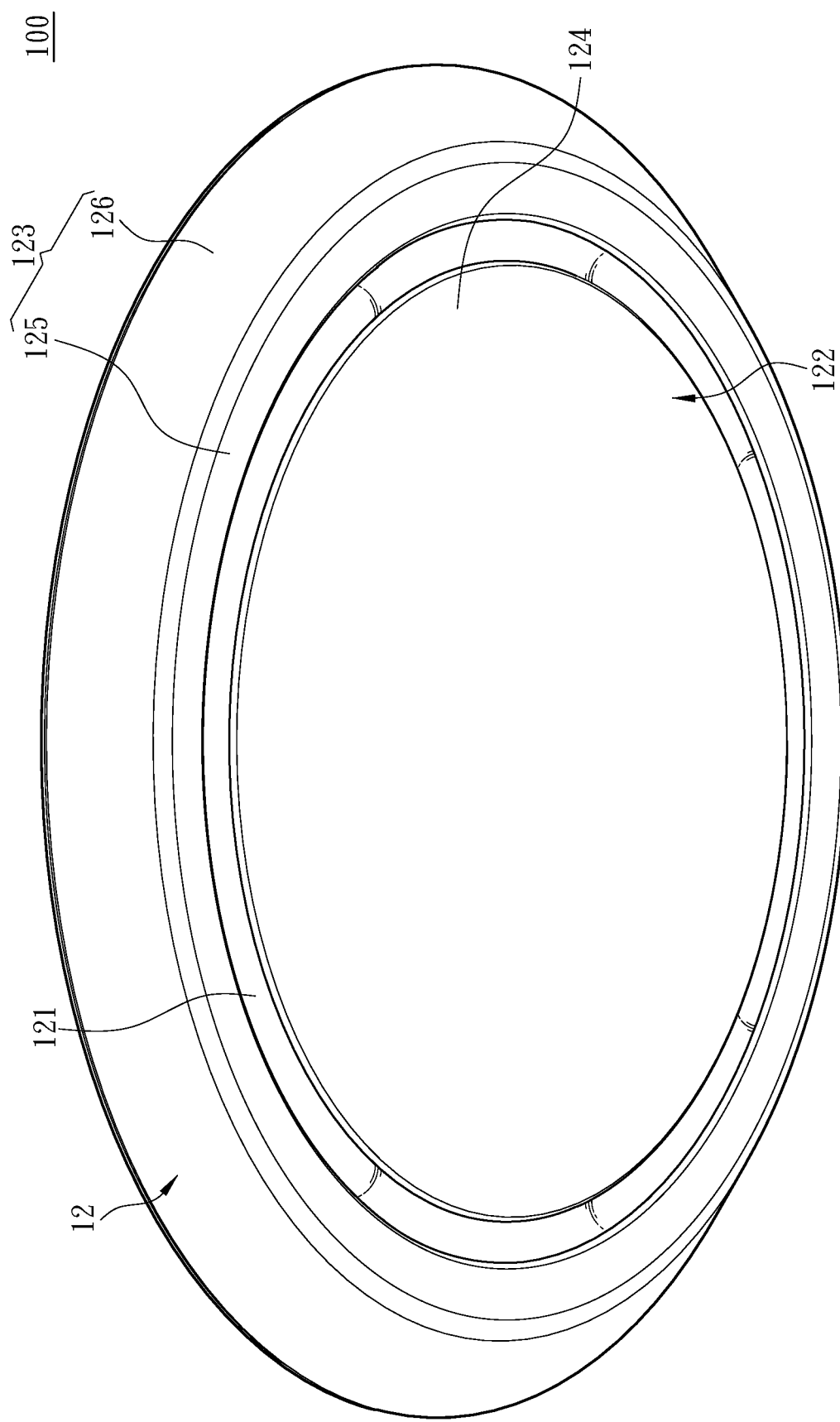
FIG. 2 is a bottom view of the structure of an embodiment of the water solar lamp of the present invention.
Figure 3:
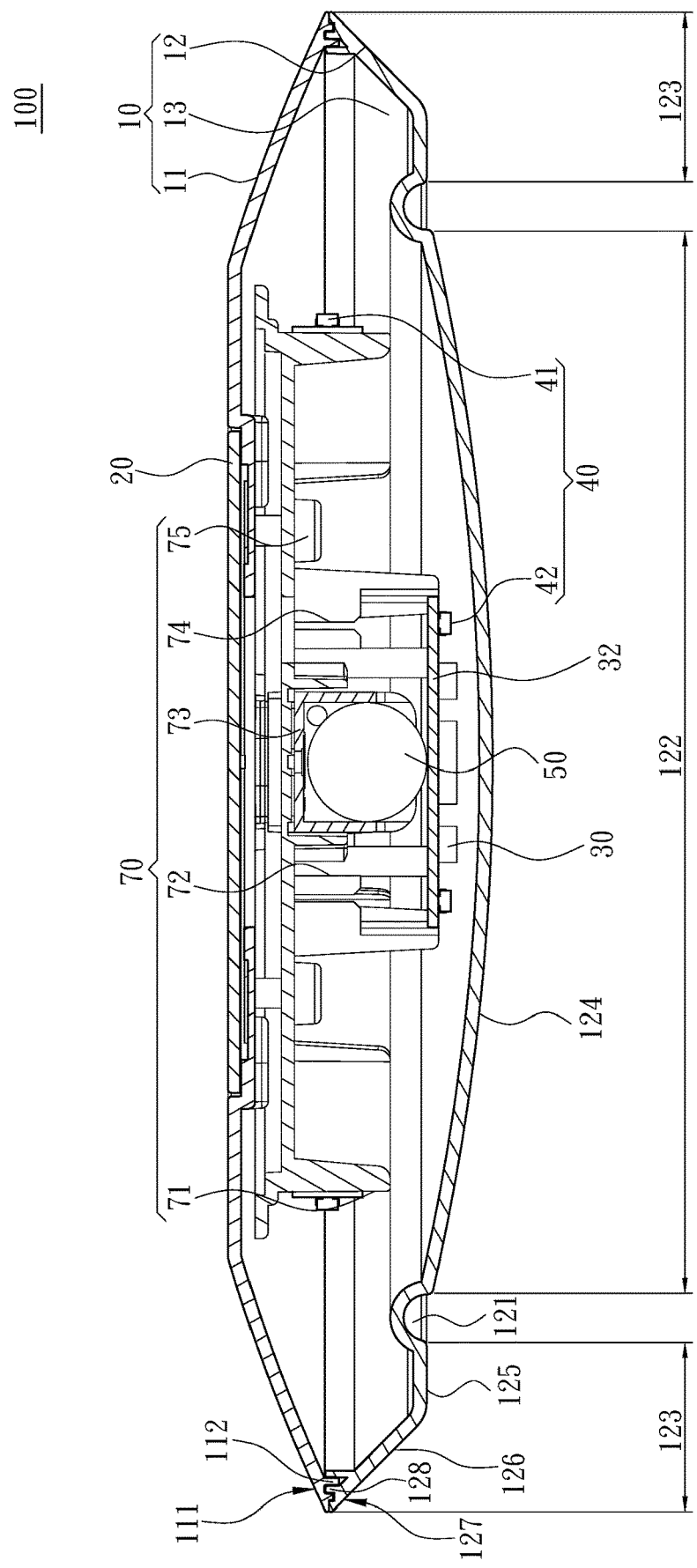
FIG. 3 is a structural cross-sectional view of an embodiment of the water solar lamp of the present invention.
Figure 4:
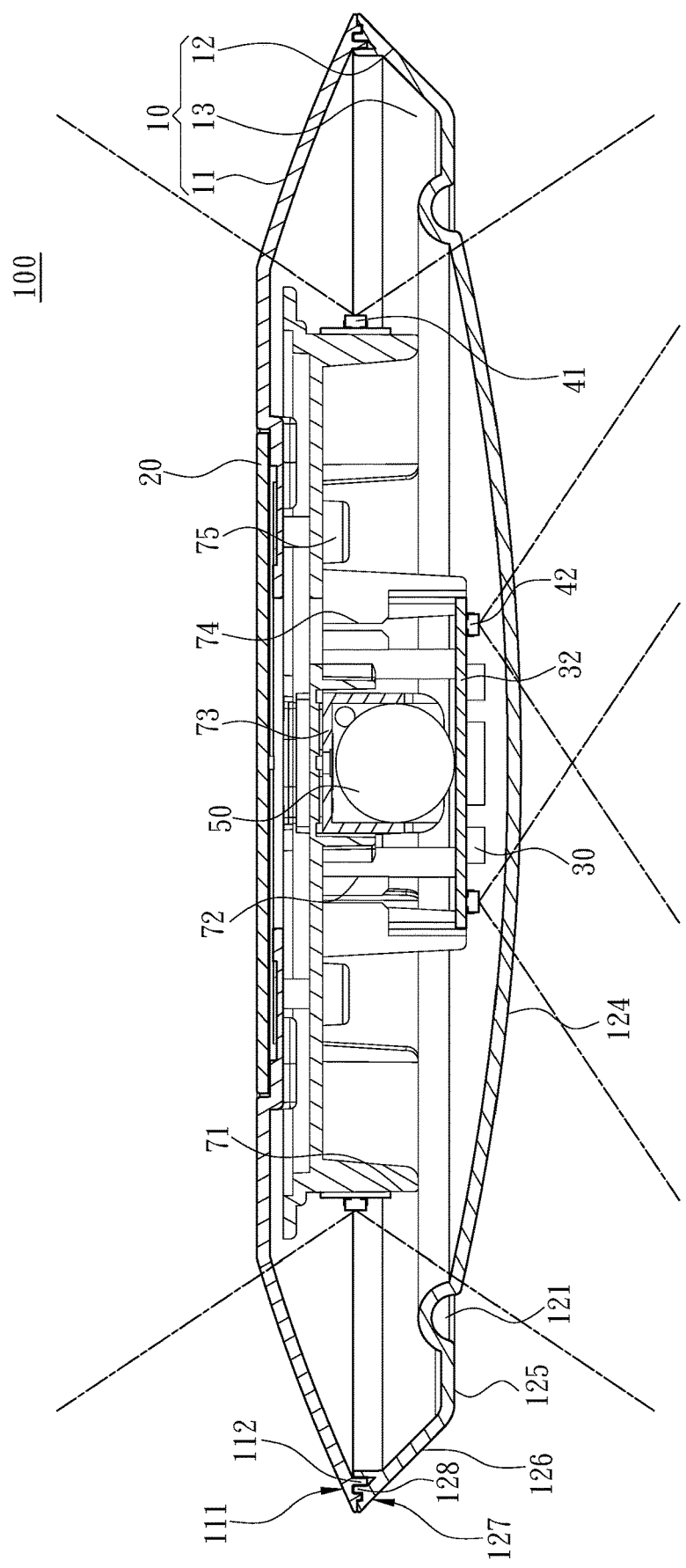
FIG. 4 is a schematic view showing irradiation of an embodiment of the water solar lamp of the present invention.

Referring to FIG. 1, FIG. 2 and FIG. 3, the present invention provides a water solar lamp 100, the water solar lamp 100 comprises a light transmissive casing 10, a solar panel 20, a power processing unit 30, and a plurality of light emitting components 40. Specifically, the light transmissive casing 10 includes an upper cover 11, a base 12 assembled with the upper cover 11, and an installation space 13 defined by the upper cover 11 and the base 12. During implementation, the light transmissive casing 10 floats on water surface, and the base 12 is set as a water-facing side. Further, the base 12 comprises a ring groove 121 for temporarily storing air when the light transmissive casing 10 is disposed on water, so that floating stability of the water solar lamp 100 is enhanced through the ring groove 121. Moreover, the ring groove 121 divides the base 12 into an inner ring region 122 and an outer ring region 123. In one embodiment, the ring groove 121 is a circle or a polygon, wherein the polygon is a nearly circular shape. Referring to FIG. 3, in one embodiment, the base 12 is an arcuate surface 124 in the inner ring region 122, and the outer ring region 123 includes a plane 125 extending from the ring groove 121, and a bevel 126 connected to the plane 125, wherein the bevel 126 extends toward the upper cover 11.

On the other hand, the solar panel 20 is disposed on the upper cover 11. A photovoltaic power 21 is outputted when the solar panel 20 receives light, and the photovoltaic power 21 is inputted to the power processing unit 30. The power processing unit 30 receives the photovoltaic power 21 and converts the photovoltaic power 21 into a converted power 22. The power processing unit 30 determines to perform power saving or power supply according to the current state. Moreover, each of the plurality of light emitting components 40 is a light-emitting diode. Each of the plurality of light emitting components 40 is disposed in the installation space 13 and connected to the power processing unit 30 to receive power for irradiate. Furthermore, the power processing unit 30 is composed of a plurality of electronic components, and the plurality of electronic components include control wafers, transistors, capacitors, inductors, resistors, and the like.

Figure 6:
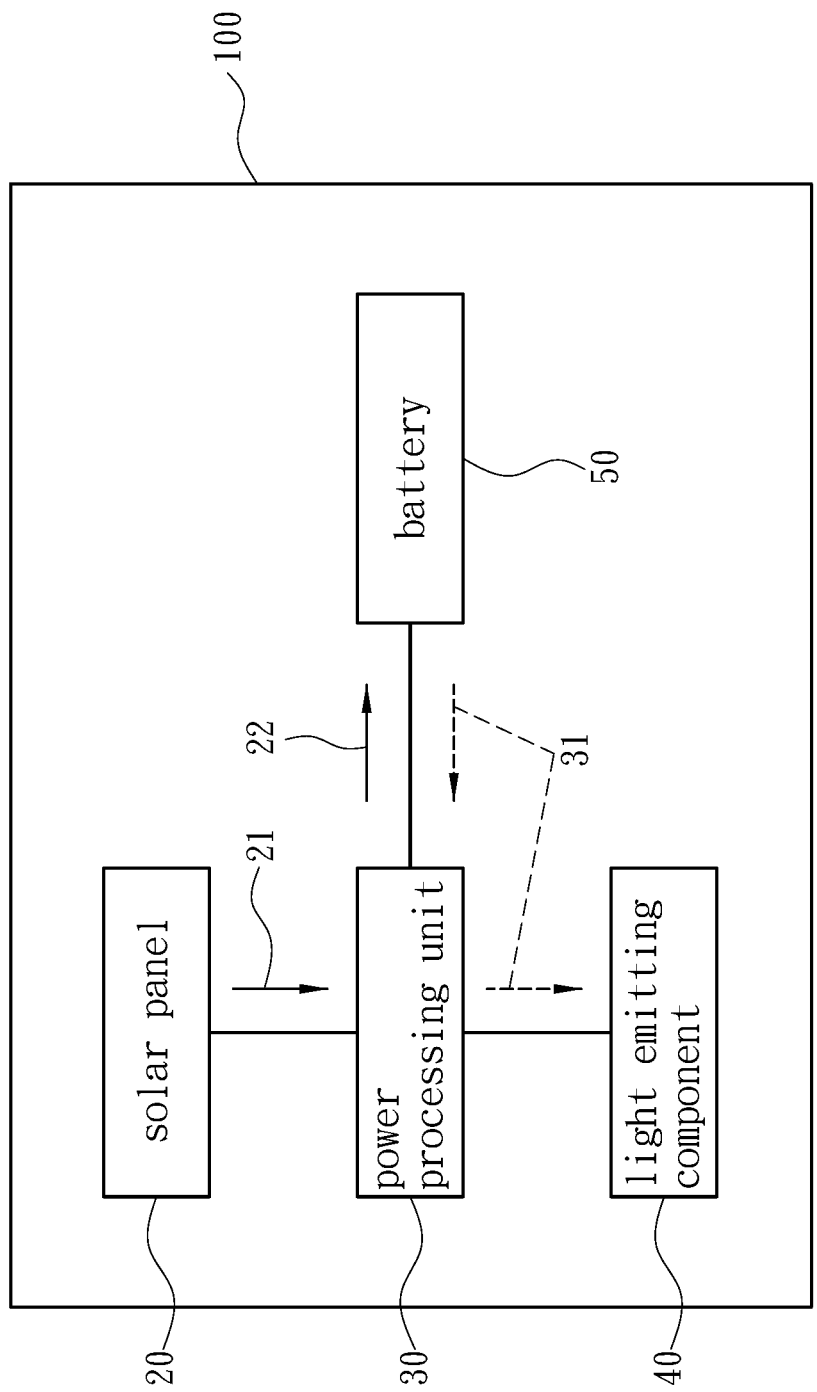
FIG. 6 is a diagram of the composition of circuit units of an embodiment of the water solar lamp of the present invention.

Referring to FIG. 3 and FIG. 6, in one embodiment, the water solar lamp 100 comprises a battery 50 disposed in the installation space 13 and connected to the power processing unit 30. In detail, the battery 50 is used to receive a working power 31 transmitted by the power processing unit 30. The battery 50 stores the working power 31 when the water solar lamp 100 is in a bright environment, once the environment is changed into a low-light or no-light where the water solar lamp 100 is located, the battery 50 outputs the stored working power 31 for use by the plurality of light emitting components 40. On the other hand, the water solar lamp 100 includes a switch 60 disposed on the upper cover 11 and connected to the power processing unit 30, that is, a user operates the switch 60 to control the water solar lamp 100. Briefly, when the water solar lamp 100 is used, the user must first press the switch 60 to activate the power processing unit 30 in preparation for driving the plurality of light emitting components 40. However, in this embodiment, turning on or turning off the switch 60 is set to be independent no matter whether the solar panel 20 is charged or not, that is, the solar panel 20 outputs the photovoltaic power 21 to the power processing unit 30 as long as the solar panel 20 receives light. In addition, the power processing unit 30 is further set to determine the light projecting mode of the plurality of light emitting components 40 based on the number of times the switch 60 is pressed to send a signal.

In one embodiment, the power processing unit 30 is disposed on a main control board 32 and determines whether the plurality of light emitting components 40 emit light based on the photovoltaic power 21 outputted by the solar panel 20. Further, the intensity of the photovoltaic power 21 depends on the degree of light received by the solar panel 20, and the power processing unit 30 is configured with a projection activating reference, and the determining factor of the projection activating reference is the intensity of the photovoltaic power 21. When the photovoltaic power 21 is greater than the projection activating reference, the power processing unit 30 determines a high-light environment except for externally controlling, and the photovoltaic power 21 is converted into the converted power 22 to be stored. Contrarily, when the photovoltaic power 21 is smaller than the projection activating reference, the power processing unit 30 determines a low-light environment and activates the plurality of light emitting components 40.

Referring to FIG. 3, in one embodiment, the water solar lamp 100 includes a support frame 70 disposed on a side of the upper cover 11 facing the base 12, and the support frame 70 provides installation for the power processing unit 30 and the plurality of light emitting components 40. In addition, the support frame 70 is connected to the upper cover 11 by at least one screw 75 disposed on the upper cover 11. In other words, the structures of the present invention disposed in the installation space 13 are only disposed on the upper cover 11 facing the base 12, so that the upper cover 11 and the base 12 are quickly disassembled, and the assembly process is simplified.

In view of the above, the plurality of light emitting components 40 of the present invention are divided into a lateral light projecting group 41 disposed around a periphery of the support frame 70, and a bottom light projecting group 42 disposed facing the base 12 according to the disposing positions. The lateral light projecting group 41 and the bottom light projecting group 42 are respectively disposed on two circuit boards, one of the circuit boards is disposed around the support frame 70, and the other circuit board is disposed on the support frame 70 and facing the base 12. Further, the support frame 70 comprises an outer wall 71 provided for disposing the lateral light projecting group 41, at least one central mounting post 72 provided for disposing the bottom light projecting group 42, a battery mounting groove 73 disposed around the battery 50 to limit a position of the battery 50, and a structural reinforcing post 74 extending from the support frame 70 toward the base 12. Furthermore, the outer wall 71 provides one of the circuit boards of the lateral light projecting group 41 to be disposed thereon, and the at least one central mounting post 72 provides one of the circuit boards of the bottom light projecting group 42 to be disposed thereon.

Figure 5:
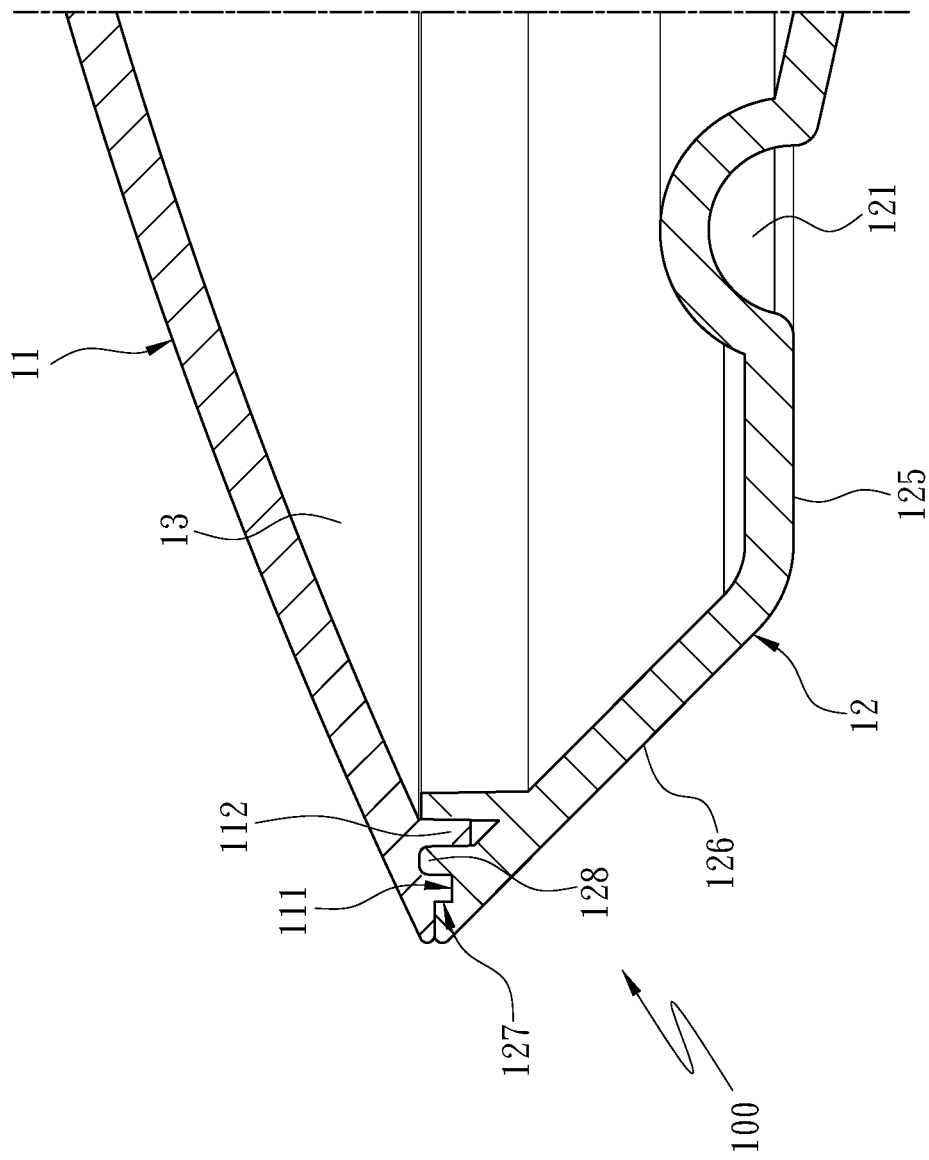
FIG. 5 is a partially enlarged structural view of an embodiment of the water solar lamp of the present invention.

In addition, referring to FIG. 5, in order to ensure that water cannot seep between the upper cover 11 and the base 12, in one embodiment, the upper cover 11 comprises a first adjoiner 111 disposed at an end edge, the base 12 comprises a second adjoiner 127 disposed at an end edge thereof and assembled to the first adjoiner 111. The first adjoiner 111 comprises a plurality of first waterproof walls 112 disposed at intervals, and heights of the plurality of first waterproof walls 112 are gradually increased from the end edge of the upper cover 11 toward the installation space 13, and the second adjoiner 127 comprises a plurality of second waterproof walls 128 disposed at intervals, and heights of the plurality of second waterproof walls 128 are gradually increased from the end edge of the base 12 toward the installation space 13. Accordingly, the present invention avoids water infiltration through the plurality of first waterproof walls 112 and the plurality of second waterproof walls 128 which are sequentially changed in height.

What is claimed is:

1. A water solar lamp, comprising:
a light transmissive casing comprising an upper cover, a base assembled with the upper cover, and an installation space defined by the upper cover and the base, the base being set as a water-facing side, the base comprising a ring groove for temporarily storing air when the light transmissive casing disposed on water, and the ring groove dividing the base into an inner ring region and an outer ring region;
a solar panel disposed on the upper cover;
a power processing unit connected to the solar panel;
a plurality of light emitting components disposed in the installation space, and connected to the power processing unit to receive power and emit light; and
a support frame disposed on a side of the upper cover facing the base and providing installation for the power processing unit and the plurality of light emitting components;
wherein the plurality of light emitting components are divided into a lateral light projecting group disposed around a periphery of the support frame, and a bottom light projecting group disposed facing the base, and the support frame comprises an outer wall provided for disposing the lateral light projecting group, and at least one central mounting post provided for disposing the bottom light projecting group.

2. The water solar lamp as claimed in claim 1, wherein the water solar lamp comprises a battery disposed in the installation space and connected to the power processing unit.

3. The water solar lamp as claimed in claim 1, wherein the shape of the ring groove is a circle or a polygon.

4. The water solar lamp as claimed in claim 1, wherein the base is an arcuate surface in the inner ring region, and the outer ring region includes a plane extending from the ring groove and a bevel connected to the plane, wherein the bevel extends toward the upper cover.

5. The water solar lamp as claimed in claim 1, wherein the water solar lamp includes a switch disposed on the upper cover and connected to the power processing unit.

6. The water solar lamp as claimed in claim 1, wherein the upper cover comprises a first adjoiner disposed at an end edge, and the base comprises a second adjoiner disposed at an end edge thereof and assembled with the first adjoiner, the first adjoiner comprises a plurality of first waterproof walls disposed at intervals, heights of the plurality of first waterproof walls are gradually increased from the end edge of the upper cover toward the installation space, and the second adjoiner comprises a plurality of second waterproof walls disposed at intervals, and heights of the plurality of second waterproof walls are gradually increased from the end edge of the base toward the installation space.

\* \* \* \* \*